US011916950B1

(12) United States Patent
Huntley et al.

(10) Patent No.: US 11,916,950 B1
(45) Date of Patent: Feb. 27, 2024

(54) COORDINATING A DISTRIBUTED VULNERABILITY NETWORK SCAN

(71) Applicant: VMware, Inc., Palo Alto, CA (US)

(72) Inventors: Sean Huntley, NSW (AU); Akeem Jenkins, Broomfield, CO (US); Marc Wayne Brotherson, Boulder, CO (US)

(73) Assignee: VMware, Inc., Palo Alto, CA (US)

( * ) Notice: Subject to any disclaimer, the term of this patent is extended or adjusted under 35 U.S.C. 154(b) by 296 days.

(21) Appl. No.: 17/228,027

(22) Filed: Apr. 12, 2021

(51) Int. Cl.
*H04L 29/00* (2006.01)
*H04L 9/40* (2022.01)

(52) U.S. Cl.
CPC .................................. *H04L 63/1433* (2013.01)

(58) Field of Classification Search
CPC ... H04L 63/1433; H04L 63/20; H04L 63/101; H04L 63/0209; H04L 47/50; H04L 47/562
See application file for complete search history.

(56) References Cited

U.S. PATENT DOCUMENTS

| | | | |
|---|---|---|---|
| 6,026,436 A | 2/2000 | Hawes | |
| 6,493,323 B1 | 12/2002 | Dobrowolski et al. | |
| 7,277,448 B1 | 10/2007 | Long et al. | |
| 7,296,293 B2 | 11/2007 | Isenberg | |
| 7,854,006 B1* | 12/2010 | Andruss | H04L 63/145 726/22 |
| 8,087,084 B1* | 12/2011 | Andruss | G06F 21/562 713/188 |
| 8,122,507 B1* | 2/2012 | Andruss | H04L 63/1408 713/188 |
| 8,205,261 B1* | 6/2012 | Andruss | G06F 21/564 726/24 |
| 8,443,445 B1* | 5/2013 | Andruss | G06F 21/564 726/24 |
| 8,875,296 B2 | 10/2014 | Moore | |
| 9,426,220 B2 | 8/2016 | Chauhan et al. | |
| 9,619,542 B2 | 4/2017 | Kamath et al. | |
| 9,800,603 B1 | 10/2017 | Sidagni | |
| 9,935,984 B1* | 4/2018 | Castilho | H04L 63/10 |

(Continued)

FOREIGN PATENT DOCUMENTS

| | | |
|---|---|---|
| CA | 2587867 A1 | 11/2007 |
| CA | 2654379 A1 | 11/2007 |
| CA | 2823911 A1 | 7/2012 |

*Primary Examiner* — Don G Zhao
(74) *Attorney, Agent, or Firm* — King Intellectual Asset Management (57) ABSTRACT

The disclosure provides an approach for coordinating a distributed vulnerability network scan. Embodiments include sending, by a computing node, a check-in message to a scanning coordinator, the check-in message indicating attributes of the computing node. Embodiments include receiving, by the computing node, a scan configuration message from the scanning coordinator, the scan configuration message comprising: scan timing information for the computing node; and a list of scanning targets for the computing node. Embodiments include determining, by the computing node, a scanning time window based on the scan timing information for the computing node. Embodiments include scanning, by the computing node, one or more scanning targets in the list of scanning targets for the computing node during the scanning time window.

18 Claims, 6 Drawing Sheets

(56) References Cited

U.S. PATENT DOCUMENTS

| | | | |
|---|---|---|---|
| 10,089,308 B1* | 10/2018 | Stacey | G06F 16/1748 |
| 10,104,203 B2 | 10/2018 | Hatton | |
| 10,225,331 B1 | 3/2019 | Freitas | |
| 10,326,655 B1 | 6/2019 | Sait et al. | |
| 10,348,767 B1 | 7/2019 | Lee et al. | |
| 10,362,057 B1 | 7/2019 | Wu | |
| 10,374,803 B2 | 8/2019 | Clark et al. | |
| 10,492,981 B1 | 12/2019 | Kumar | |
| 10,778,457 B1 | 9/2020 | Mathew et al. | |
| 10,841,157 B2 | 11/2020 | Brotherson et al. | |
| 10,892,912 B2 | 1/2021 | Pakhomov et al. | |
| 10,958,662 B1 | 3/2021 | Sole et al. | |
| 11,032,143 B2 | 6/2021 | Patterson et al. | |
| 11,425,022 B1 | 8/2022 | Singh et al. | |
| 11,528,317 B1 | 12/2022 | Jenkins et al. | |
| 11,552,979 B1* | 1/2023 | Soudhamma | G06F 16/25 |
| 11,582,261 B2* | 2/2023 | Vivekanandan | H04L 63/20 |
| 2002/0030851 A1 | 3/2002 | Wanda | |
| 2004/0128530 A1 | 7/2004 | Isenberg | |
| 2004/0205153 A1 | 10/2004 | Weisshaar et al. | |
| 2007/0038680 A1 | 2/2007 | Casey | |
| 2007/0198487 A1 | 8/2007 | Masuda et al. | |
| 2007/0244894 A1 | 10/2007 | St. Jacques | |
| 2007/0261112 A1 | 11/2007 | Todd et al. | |
| 2009/0103539 A1 | 4/2009 | Keeler et al. | |
| 2010/0094925 A1 | 4/2010 | St Jacques, Jr. et al. | |
| 2010/0179987 A1 | 7/2010 | Sebastian et al. | |
| 2013/0191350 A1 | 7/2013 | Esaka et al. | |
| 2013/0311603 A1 | 11/2013 | Wang et al. | |
| 2014/0047086 A1 | 2/2014 | Klimetschek et al. | |
| 2014/0157405 A1 | 6/2014 | Joll et al. | |
| 2015/0103679 A1 | 4/2015 | Tessmer et al. | |
| 2015/0370723 A1 | 12/2015 | Nambiar et al. | |
| 2015/0373044 A1 | 12/2015 | Stiansen et al. | |
| 2016/0044054 A1 | 2/2016 | Stiansen et al. | |
| 2016/0360013 A1 | 12/2016 | Li et al. | |
| 2016/0364200 A1 | 12/2016 | Beveridge et al. | |
| 2016/0366160 A1 | 12/2016 | Kapoor et al. | |
| 2017/0026387 A1 | 1/2017 | Vissamsetty et al. | |
| 2017/0171244 A1 | 6/2017 | Vissamsetty et al. | |
| 2018/0026843 A1* | 1/2018 | Sharp-Paul | H04L 41/0869 709/224 |
| 2018/0027009 A1 | 1/2018 | Santos et al. | |
| 2018/0108204 A1* | 4/2018 | Zhang | B65D 81/052 |
| 2018/0131839 A1* | 5/2018 | Nakajima | H04N 1/00344 |
| 2018/0332005 A1 | 11/2018 | Ettema et al. | |
| 2018/0367541 A1 | 12/2018 | Ponnuswamy et al. | |
| 2019/0036911 A1* | 1/2019 | Bell | H04L 63/1433 |
| 2019/0081982 A1* | 3/2019 | Breton | G06F 21/50 |
| 2019/0199748 A1 | 6/2019 | Gopalakrishna | |
| 2019/0253453 A1 | 8/2019 | Vissamsetty et al. | |
| 2019/0320018 A1 | 10/2019 | Karaje et al. | |
| 2020/0265358 A1 | 8/2020 | Irimie et al. | |
| 2020/0274802 A1 | 8/2020 | Wan et al. | |
| 2020/0320023 A1 | 10/2020 | Litichever et al. | |
| 2020/0389469 A1 | 12/2020 | Litichever et al. | |
| 2020/0412824 A1 | 12/2020 | Liguori et al. | |
| 2021/0021640 A1 | 1/2021 | Wu et al. | |
| 2021/0029125 A1 | 1/2021 | Moon | |
| 2021/0067551 A1 | 3/2021 | Hebert et al. | |
| 2021/0136110 A1 | 5/2021 | Sites | |
| 2021/0152597 A1 | 5/2021 | Sites | |
| 2021/0182240 A1 | 6/2021 | Dongieux | |
| 2021/0200830 A1 | 7/2021 | Shribman et al. | |
| 2021/0243213 A1* | 8/2021 | Yamada | H04L 63/0236 |
| 2022/0027496 A1 | 1/2022 | Struttmann | |
| 2022/0078044 A1 | 3/2022 | Shribman et al. | |
| 2022/0103525 A1 | 3/2022 | Shribman et al. | |
| 2022/0138753 A1 | 5/2022 | Wright et al. | |
| 2022/0188425 A1 | 6/2022 | Wyatt et al. | |
| 2022/0311937 A1 | 9/2022 | Fujimori | |
| 2023/0020504 A1 | 1/2023 | Moon | |
| 2023/0024127 A1 | 1/2023 | Moon | |
| 2023/0083404 A1* | 3/2023 | Dong | H04L 41/0853 709/224 |

\* cited by examiner

COORDINATING A DISTRIBUTED VULNERABILITY NETWORK SCAN

BACKGROUND

Networking environments, such as physical networks and software-defined networking (SDN) environments, may be vulnerable to various types of attacks and problems, such as malware and other security breaches. As such, it is beneficial to regularly scan networks for vulnerabilities and issues. As networking environments become large, scanning may be distributed across various devices so that processing and communication resources of a single device are not overburdened. However, distributed scans in networking environments are difficult to coordinate by autonomous scanning nodes. For example, a balance must be struck between the speed of the scan, the effectiveness of the scan, processing and communication resource utilization, and the like.

Without a broad picture of the networking environment, individual scanning nodes may transmit data simultaneously, and may cause congestion in the network. Other problems with conventional distributed scanning techniques include the possibility of redundant scanning, lack of high-level analysis of data captured by scanning nodes, unpredictability of processing and communication resource utilization by scanning nodes, and the like.

As such, there is a need in the art for improved techniques of performing distributed vulnerability scans in networking environments.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for coordinating a distributed vulnerability network scan. In certain embodiments, a centralized scanning coordinator determines various parameters related to a distributed scan by a plurality of scanning nodes in a networking environment. Scanning nodes may be physical or virtual computing devices capable of receiving and/or analyzing data from one or more scanning targets. Scanning targets may be physical or virtual computing devices from which data is gathered and analyzed, such as to check for security vulnerabilities and other issues. Parameters for a distributed scan may relate to timing of scans as well as to assigning scanning targets to scanning nodes.

In some embodiments, each scanning node checks in with the scanning coordinator in order to receive scanning parameters. The scanning coordinator assigns scanning targets to each given scanning node based on attributes of the given scanning node, such as connectivity, physical location, capabilities, resource availability, and the like. The scanning coordinator also determines when scanning nodes are to perform scans. In certain embodiments, scanning nodes are divided into scanning groups (e.g., based on attributes of the scanning nodes) and scanning groups are assigned specific windows of time in which to perform scans. The scanning coordinator may send a configuration message to each scanning node (e.g., in response to a check-in message from the scanning node) including, for example, a list of scanning targets assigned to the scanning node and scan timing information that informs the scanning node of when it is to perform scans of its assigned scanning targets. Scanning nodes may then perform scans of their assigned scanning targets at times indicated by the scanning coordinator and may, in some instances, send results of the scans back to the scanning coordinator.

Accordingly, embodiments of the present disclosure improve upon conventional techniques for performing vulnerability scans in networking environments by allowing for coordinated, predictable, and efficient utilization of processing and communication resources during distributed scans. By providing centralized coordination of scan timing and distribution of scanning targets among scanning nodes, techniques described herein overcome the problems associated with existing techniques, such as the problem of too many scans being performed simultaneously (e.g., referred to as scan storms), the problem of overburdening resources of certain computing systems, and the problem of being unable to predict when scans will be performed.

Figure 1A:
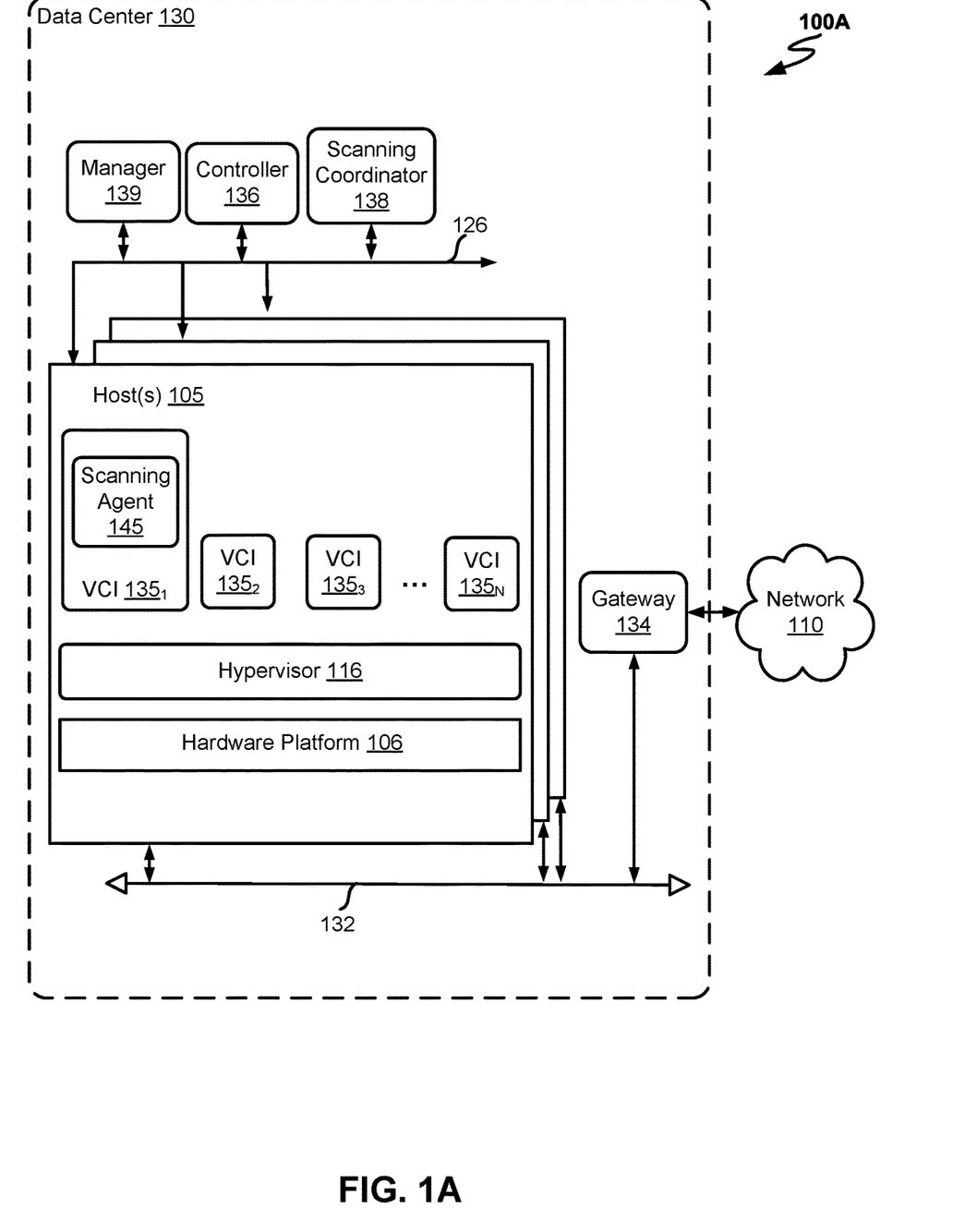
FIG. 1A depicts a block diagram of physical and virtual components of a network in which one or more embodiments of the present disclosure may be utilized.

FIG. 1A is a block diagram depicting physical and virtual components of a networking environment 100A, in which one or more embodiments of the present disclosure may be utilized.

Networking environment 100 includes a data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_N$ (collectively referred to as VCIs 135 and individually referred to as VCI 135) that run concurrently on the same host. VCIs 135 may, for example, be virtual machines (VMs), virtual appliances, containers, and/ or the like. Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although aspects of the disclosure are described with reference to VMs, the teachings herein also apply to other types of VCIs or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations (not shown) external to data center 130. Gateway 134 may be a VCI, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or VCIs that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 139 generally represents a management plane comprising one or more computing devices responsible for receiving logical network configuration inputs, such as from a network administrator, defining one or more endpoints (e.g., VMs and/or containers) and the connections between the endpoints, as well as rules governing communications between various endpoints. In some embodiments, manager 139 communicates with hosts 105 via controller 136, which receives and transmits data to and from hosts 105 via management network 126.

Scanning coordinator 138 generally represents a computing entity that coordinates distributed vulnerability scans in data center 130. Scanning coordinator 138 may run on one or more physical computing devices (e.g., a server) and/or one or more VCIs 135. In some embodiments, scanning coordinator 138 is implemented in a distributed manner across a plurality of computing devices, while in other embodiments scanning coordinator 138 runs on a single computing device. As described in more detail below with respect to FIGS. 2-5, scanning coordinator 138 determines parameters for distributed scans and sends the parameters to scanning nodes.

VCI $135_1$ includes a scanning agent 145, which may be an agent of scanning coordinator 138, and may cause VCI $135_1$ to function as a scanning node. Some or all of VCIs $135_{2-n}$ may also include a scanning agent. Scanning agent 145 communicates with scanning coordinator 138, such as to send check-in messages and receive configuration messages for coordination of distributed scans. Scanning agent 145 (or another component of VCI $135_1$) then performs scans of one or more scanning targets based on information included in the configuration messages. Scanning targets may include, for example, other VCIs 135. In some embodiments, scanning targets and scanning nodes may overlap, such that a single VCI 135 may be both a scanning node and a scanning target.

Coordination by scanning coordinator 138 of distributed scans by scanning nodes such as VCI $135_1$ is described in more detail below with respect to FIG. 2.

Figure 1B:
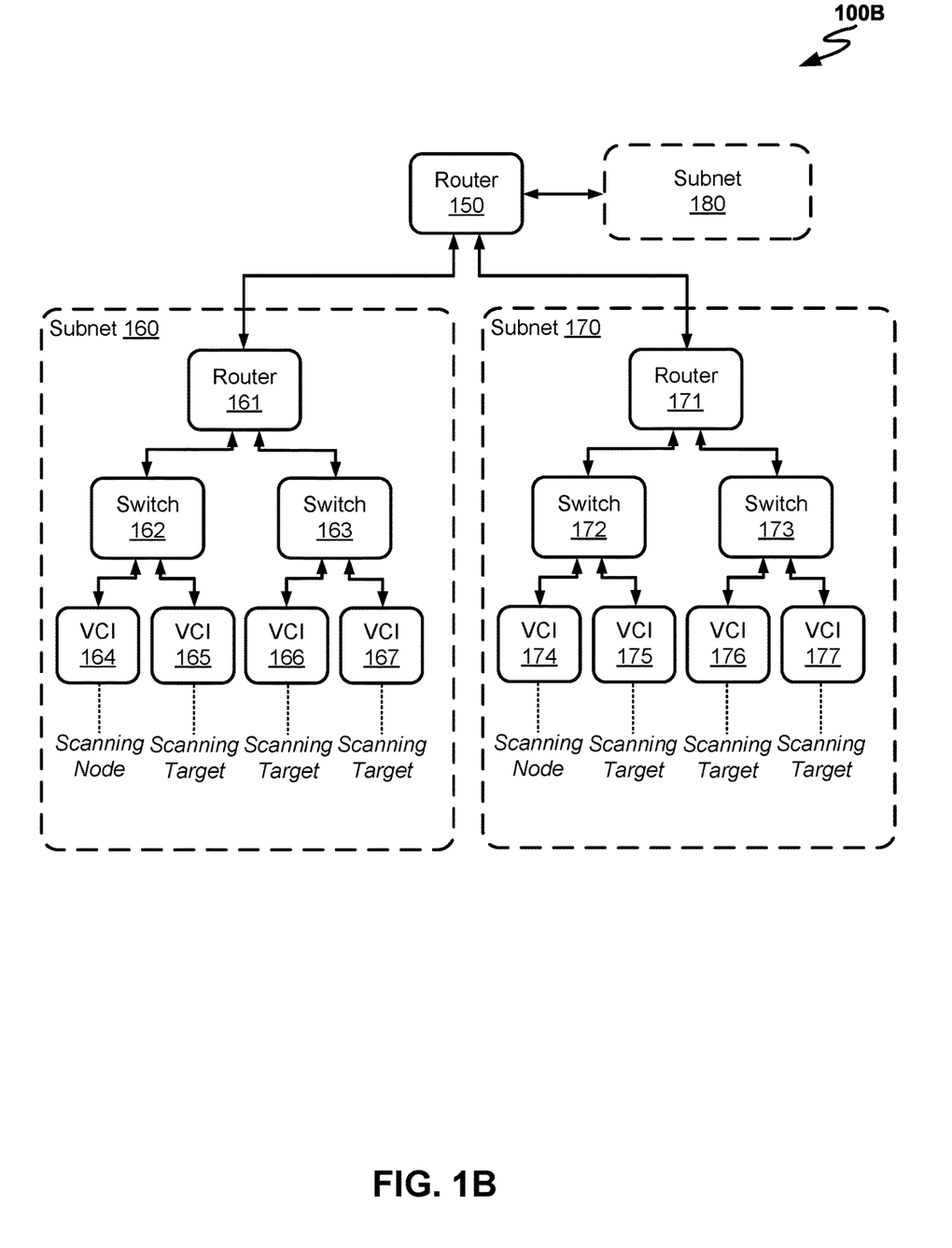
FIG. 1B depicts a block diagram of a networking environment in which one or more embodiments of the present disclosure may be utilized.

FIG. 1B depicts a block diagram of a networking environment 100B in which embodiments of the present disclosure may be implemented. For example, a distributed scan as described herein may be performed in networking environment 100B in order to scan subnets 160, 170, and 180.

Networking environment 100B comprises subnets 160, 170, and 180 connected by a router 150. Subnets 160, 170, and 180 generally represent separate subsets of networking environment 100B. The routers and switches shown may be physical routers and switches, logical routers and switches, or a combination. Routers 161 and 171 may be logical routers (e.g., which may be implemented as one or more virtual routers in one or more hosts that implement the logical routers). Router 161 is connected to switches 162 and 163 (e.g., logical switches, which may be implemented as one or more virtual switches in one or more hosts that implement the logical switches), which are in turn connected to VCIs 164, 165, 166, and 167. Similarly, router 171 is connected to switches 172 and 173, which are in turn connected to VCIs 174, 175, 176, and 177. Subnet 180 may include similar components to those shown with respect to subnets 160 and 170.

Techniques described herein allow a distributed scan to be effectively orchestrated across networking environment 100B such that subnets 160, 170, and 180 can be scanned in a coordinated and predictable manner. For instance, as described in more detail below with respect to FIG. 2, a scanning coordinator may coordinate scanning nodes (e.g., VCIs 164 and 174) in each of subnets 160, 170, and 180 in order to perform a distributed scan of scanning targets (e.g., VCIs 166-167 and 175-177) in the subnets.

Figure 2:
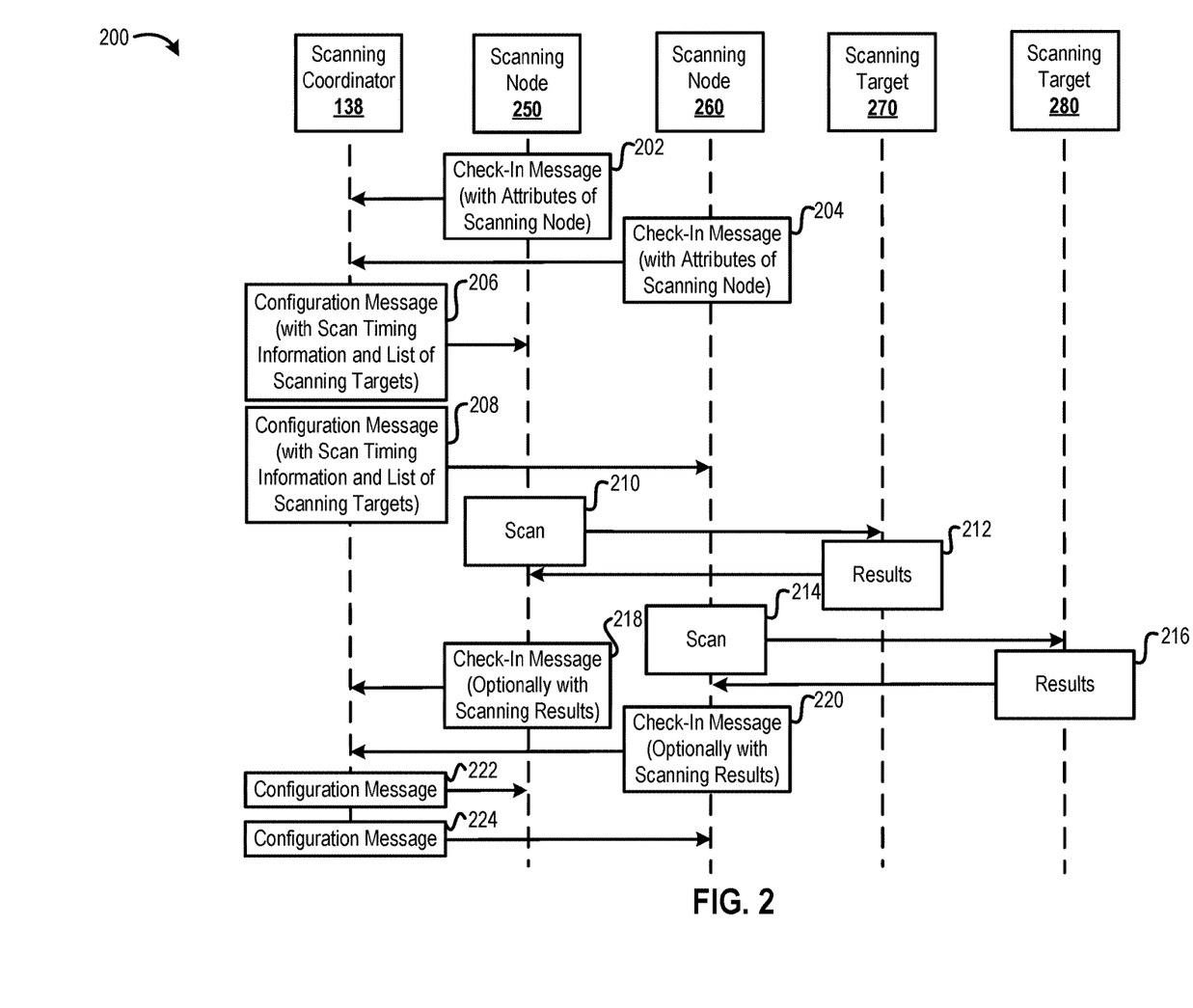
FIG. 2 depicts a block diagram of an example related to coordinating a distributed vulnerability network scan.

FIG. 2 depicts a block diagram 200 of an example related to coordinating a distributed vulnerability network scan. Block diagram 200 includes scanning coordinator 138 of FIG. 1. Scanning nodes 250 and 260 and scanning targets 270 and 280 may be representative of computing entities such as VCIs 135 of FIG. 1, physical computing entities, etc.

At 202, scanning node 250 sends a check-in message to scanning coordinator 138. The check-in message includes one or more attributes of scanning node 250, such as connectivity information (e.g., which L2 networks and/or VCIs scanning node 250 is connected to), physical location (e.g., rack location, GPS location, and/or the like), capabilities (e.g., types of protocols supported), resource availability (e.g., memory, processing, and/or network resource utilization information), and the like. Likewise, scanning node 260 sends a check-in message to scanning coordinator 138, including one or more attributes of scanning node 260 similar to those identified above at 202. The check-in messages sent by scanning nodes 250 and 260 at 202 and 204 may be initial check-in messages that are sent when scanning nodes 250 and 260 are first added to the system, such as after being configured as scanning nodes by an administrator.

At 206 and 207, scanning coordinator 138 sends configuration messages to scanning nodes 250 and 260, respectively. Each of the configuration messages includes scan timing information and a list of scanning targets. Scanning coordinator 138 may determine the scan timing information and/or the list of scanning targets for each scanning nodes based on attributes of the scanning nodes (e.g., sent by the scanning nodes in check-in messages).

In some embodiments, scan timing information sent to a given scanning node includes a window length (e.g., in nanoseconds), a starting time for synchronization of a first scanning group, a total number of scanning groups, a scanning group number of the given scanning node, a check-in frequency, a number of scans per window, a scanning target list length, and/or the like. As described in more detail below with respect to FIG. 3, each scanning group may be assigned a scanning window, starting with a scanning window for the first scanning group beginning at the starting time for synchronization of the first scanning group. An "epoch" may be defined as an amount of time encompassing one scanning window for each scanning group, such that an epoch is completed once all scanning groups have completed one respective scanning window. A scanning node determines when to perform scans based on its scanning group number. For instance, if a scanning node is in the first scanning group, its assigned window begins at the starting for synchronization of the first scanning group. If a scanning node is in the second scanning group, its assigned window begins one window length after the starting time for synchronization of the first scanning group, and so on. Each scanning node can determine the length of an epoch based on the window length and the total number of scanning groups, and thus can determine its assigned scanning window in each of multiple subsequent epochs based on a single configuration message. In some embodiments, all nodes are synchronized to a same timeline using known techniques.

A check-in frequency indicates how often a scanning node should send a check-in message to the scanning coordinator. Check-in messages may include attributes of the scanning node and/or results of scans (e.g., indications of whether vulnerabilities were detected at scanning targets).

Scanning nodes may be divided into scanning groups based on attributes of the scanning nodes or based on any other criteria, including arbitrarily. The purpose of dividing scanning nodes into scanning groups is to temporally distribute resource utilization. In some embodiments a scanning group may include a single scanning node. In one example, in order to divide scanning nodes into scanning groups, scanning coordinator 138 may construct a mathematical graph of all scanning nodes, where edges of the graph are drawn based on attributes such as IP addresses, locality, physical location, connectivity, and resources of the scanning nodes. Scanning coordinator 138 may then use a graph coloring algorithm to determine scanning groups. As is known in the art, graph coloring algorithms involve assigning labels (e.g., "colors") to vertices of a graph such that any two vertices that are adjacent to one another (e.g., that share an edge) must not share a label.

Scanning targets may be assigned to scanning nodes based on attributes of the scanning nodes and/or based on scanning groups. For instance, a given scanning target may be assigned to the scanning node that is physically nearest to the given scanning target or that is the smallest number of network hops away from the given scanning target, and/or based on other factors such as resource availability at scanning nodes. The mathematical graph described above may be used in assigning scanning targets to scanning nodes, and may ensure that two scanning nodes are not selected for the same scanning target, such as through the use of a graph coloring algorithm.

The configuration message sent by scanning coordinator 138 to scanning node 250 at 206 indicates that scanning target 270 is a scanning target for scanning node 250. Likewise, the configuration message sent by scanning coordinator 138 to scanning node 260 at 208 indicates that scanning target 280 is a scanning target for scanning node 260.

At 210, scanning node 250 scans scanning target 270 based on the configuration message received at 208 (e.g., at a time selected based on the scan timing information). Scanning may involve requesting certain data from scanning target 270, such as performance metrics (e.g., resource utilization, information on speed of processing and communications, and/or the like), logs (e.g., which may indicate whether errors or exceptions occurred), and the like, in order to analyze the data for indications of security vulnerabilities and/or other issues. A vulnerability or issue may be determined, for example, by applying rules or signatures to the data gathered during the scan, such as by determining whether conditions known to be associated with a vulnerability or issue are present on a scanning target. At 212, scanning node 250 receives results from scanning target 270 (e.g., the requested data), which scanning node 250 analyzes according to one or more rules for detecting vulnerabilities and/or issues. Similarly, at 214, scanning node 260 scans scanning target 280 (e.g., at a time selected based on the scan timing information) and, at 216, scanning node 260 receives results from scanning target 280, which scanning node 250 analyzes.

At 218, scanning node 250 sends another check-in message to scanning coordinator, such as based on a check-in frequency indicated in the configuration message sent at 206. The check-in message may, in some embodiments, include results of the scan performed at 210, such as an indication of whether any vulnerabilities or issues were discovered. The check-in message may also include updated attributes of scanning node 250 for use by scanning coordinator in potentially modifying scanning groups and/or scanning targets based on up-to-date conditions. Similarly, at 220, scanning node 260 sends a check-in message to scanning coordinator, such as based on the check-in frequency indicated in the configuration message sent at 208, and optionally including results of the scan performed at 214 and/or updated attributes of scanning node 260.

At 222 and 224, scanning coordinator sends configuration messages to scanning nodes 250 and 260, respectively (e.g., in response to the check-in messages). The configuration messages may include updated scan timing information (e.g., potentially including changes relating to group membership) and/or updated lists of scanning targets.

Figure 3:
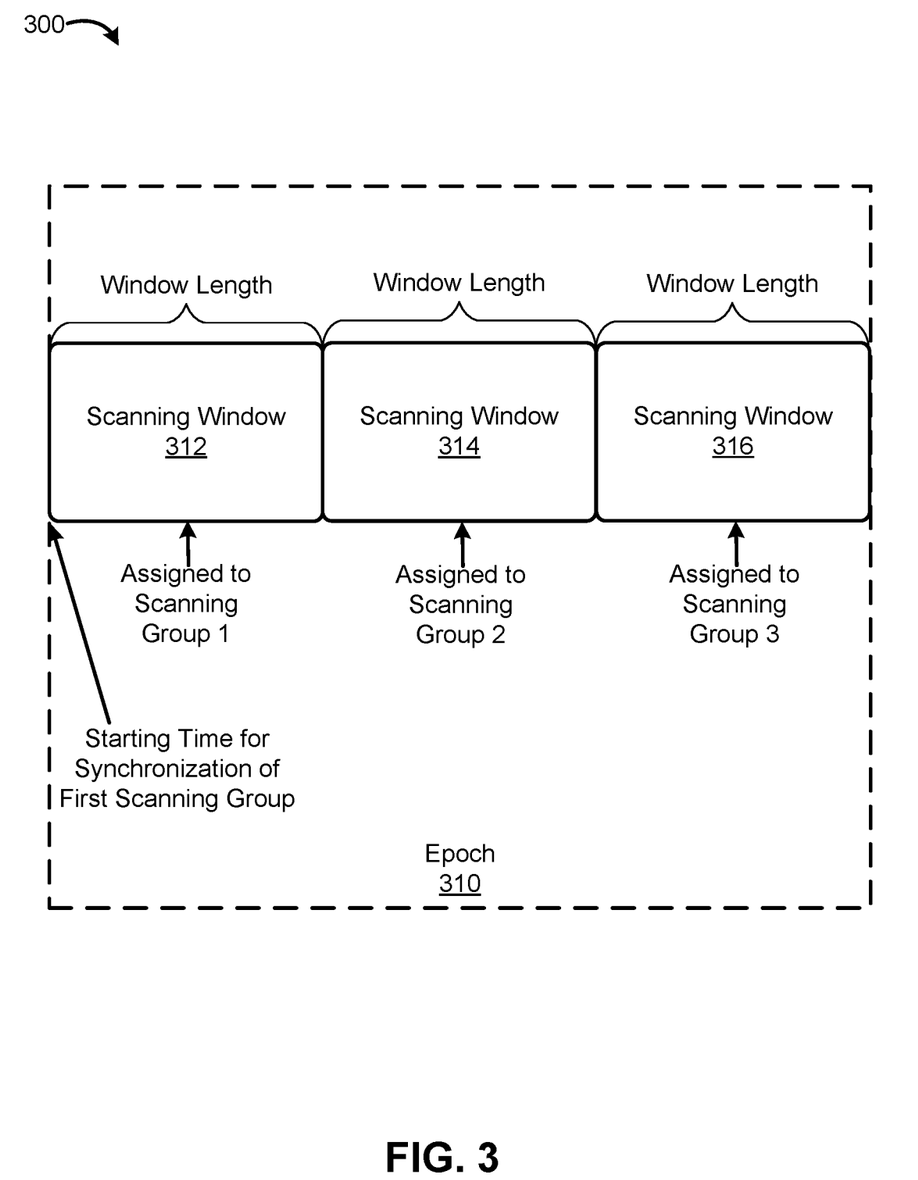
FIG. 3 is an illustration of timing for distributed vulnerability network scans.

FIG. 3 is an illustration 300 of timing for distributed vulnerability network scans.

An epoch 310 begins at the starting time for synchronization of a first scanning group (e.g., which may be defined relative to a fixed source, such as time of day according to a central authority). Scanning windows 312, 314, and 316 are encompassed within epoch 310, each of which has the same window length. In illustration 300, there are three total scanning groups. The first scanning window 312 is assigned to scanning group 1, the second scanning window 314 is assigned to scanning group 2, and the third scanning window 316 is assigned to scanning group 3.

A scanning node within a given scanning group performs scans of its assigned scanning targets within its assigned scanning window once per epoch. Thus, processor and communication resource utilization in the network is predictable and distributed both spatially (e.g., across different parts of the network) and temporally so as not to cause congestion or other issues (e.g., reduced performance, security issues due to scans that were not able to be completed because of resource unavailability, and the like) in the network.

In some cases, vulnerability scanning can be made more effective by considering the inhomogeneous distribution of vulnerable scan targets. Often, vulnerable nodes on a network are clustered together, leaving large parts of the scan spectrum barren. To take advantage of this characteristic of the network, if this is the first time a scanning node is present on a given subnet, the scanning coordinator will authorize the scan of said local subnet. This scan may be done in parallel using existing scanning windows, or may be added to the local scanning list so the local scanning node cannot differentiate between local scanning and remote scanning.

An additional benefit of the techniques described herein is that they allow stateful firewall caches to be overwritten. For example, by assigning scanning targets to scanning nodes behind the same firewall, a low and slow scan may be performed of the scanning targets without being shut down by an intrusion detection system (IDS) or intrusion prevention system (IPS).

Figure 4:
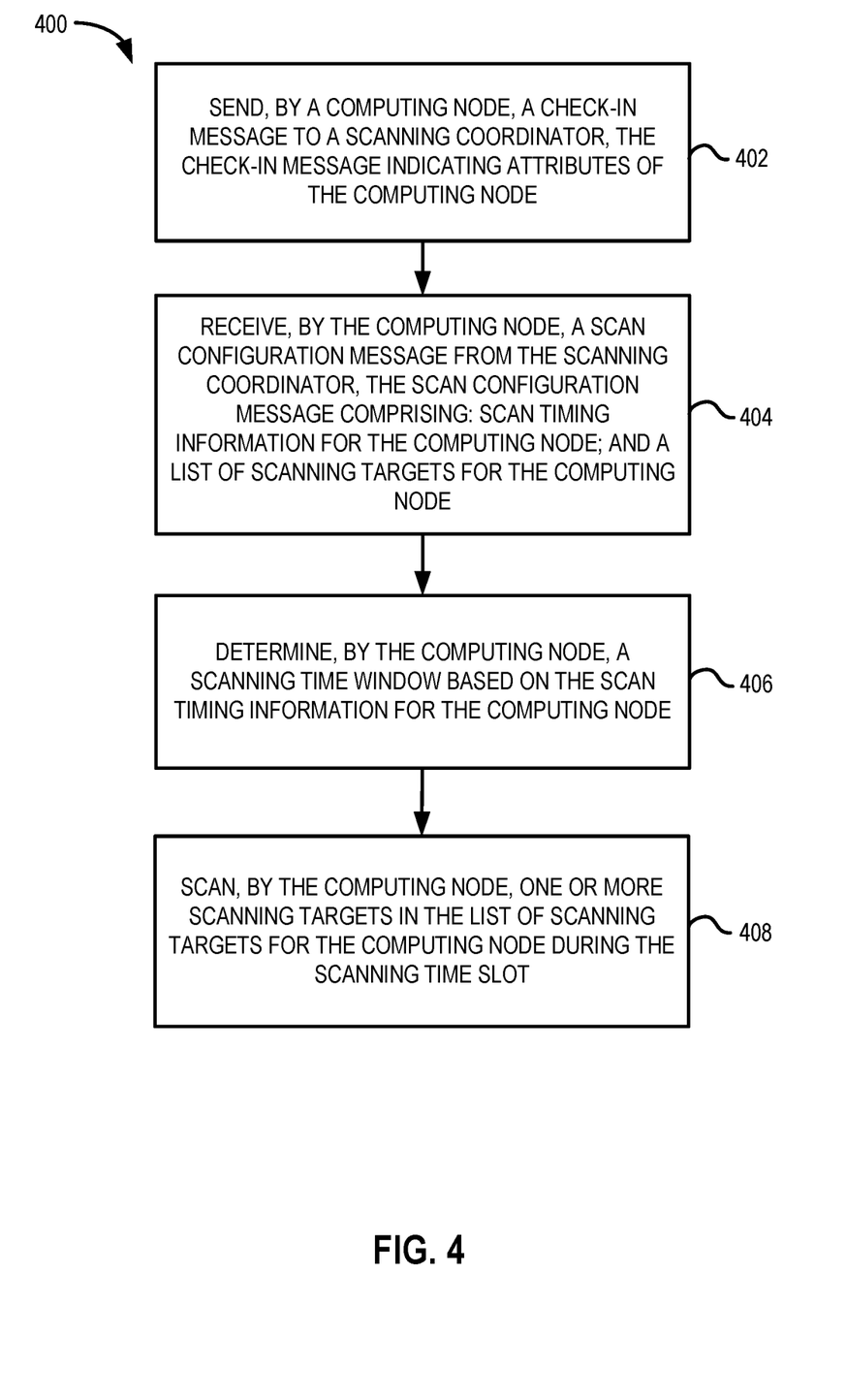
FIG. 4 depicts a flow diagram of operations related to coordinating a distributed vulnerability network scan.

FIG. 4 depicts a flow diagram of operations 400 related to coordinating a distributed vulnerability network scan. In some embodiments, operations 400 are performed by one or more components of data center 130 of FIG. 1, such as one or more VCIs 135 and/or scanning coordinator 138 of FIG. 1

At step 402, a computing node sends a check-in message to a scanning coordinator, the check-in message indicating attributes of the computing node. The attributes may include, for example, an internet protocol (IP) address of the computing node, one or more connections of the computing node, a physical location of the computing node, and/or resource availability information for the computing node.

At step 404, the computing node receives a scan configuration message from the scanning coordinator, the scan configuration message comprising: scan timing information for the computing node; and a list of scanning targets for the computing node. In some embodiments, the scan timing information for the computing node comprises: a starting time for synchronization of a first scanning group; a window length; a total number of scanning groups; and a scanning group number of the computing node. The scan timing information may also include additional information such as a number of scans per window and a check-in frequency. The scanning coordinator may have determined the scan timing information for the computing node and/or the list of scanning targets for the computing node based on the attributes of the computing node. Certain embodiments further include assigning, by the scanning coordinator, the computing node to a scanning group based on the attributes of the computing node, which may include generating a graph based on the attributes of the computing node (as well as attributes of other computing nodes). Groups may be determined in some embodiments using a graph coloring algorithm.

At step 406, the computing node determines a scanning time window based on the scan timing information for the computing node. For example, the computing none may identify a beginning time of the scanning time window based on the starting time for synchronization of the first scanning group, the window length, and the scanning group number of the computing node.

At step 408, the computing node scans one or more scanning targets in the list of scanning targets for the computing node during the scanning time window.

Figure 5:
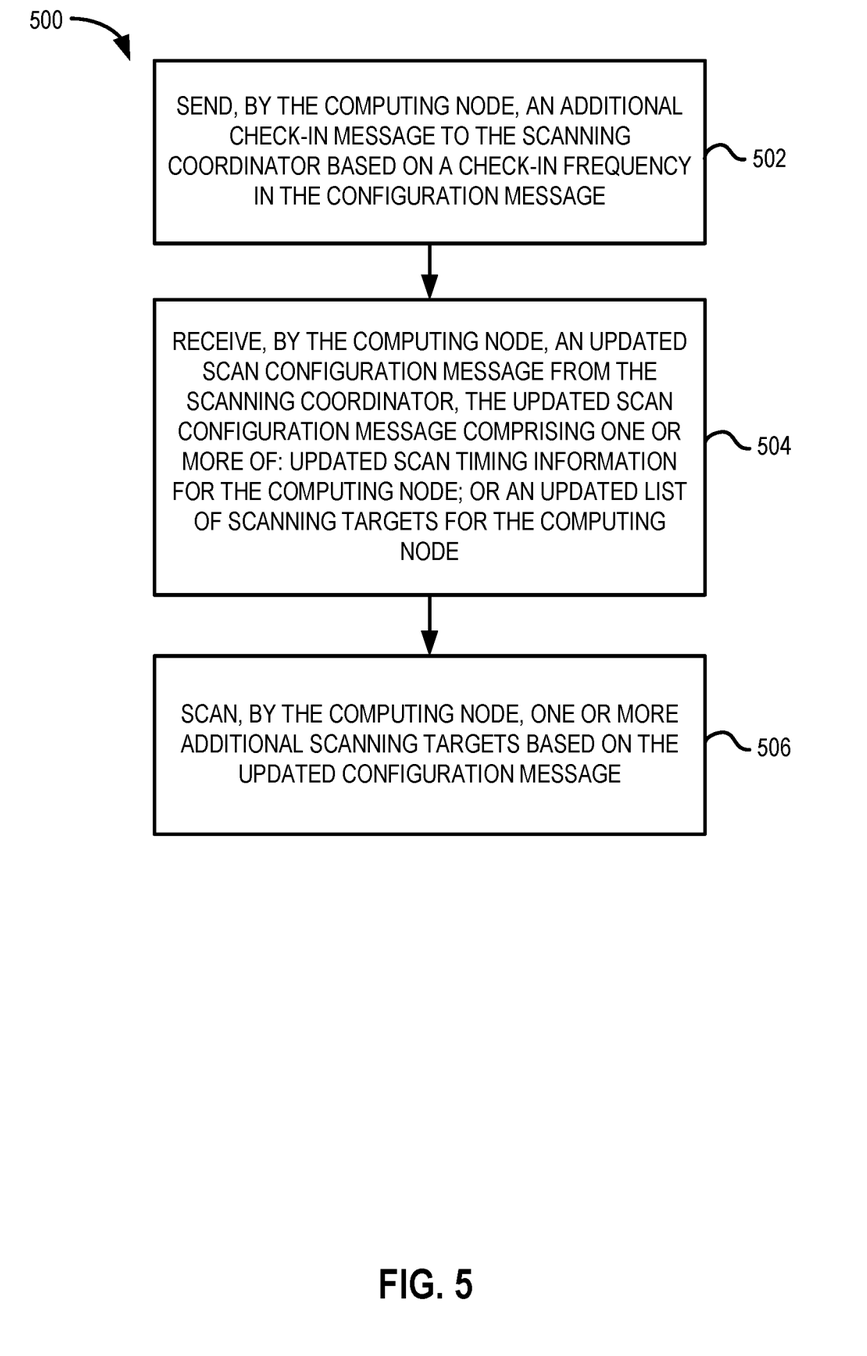
FIG. 5 depicts a flow diagram of additional operations related to coordinating a distributed vulnerability network scan.

FIG. 5 depicts a flow diagram of additional operations 500 related to coordinating a distributed vulnerability network scan. In some embodiments, operations 500 are performed by one or more components of data center 130 of FIG. 1, such as one or more VCIs 135 and/or scanning coordinator 138 of FIG. 1. Operations 500 may follow operations 400 of FIG. 4.

At step 502, the computing node sends an additional check-in message to the scanning coordinator based on the check-in frequency indicated in the configuration message described above with respect to step 404 of FIG. 4, and may include results of the scan and/or updated attributes of the computing node in the check-in message.

At step 504, the computing node receives an updated scan configuration message from the scanning coordinator, the updated scan configuration message comprising one or more of: updated scan timing information for the computing node; or an updated list of scanning targets for the computing node.

At step 506 the computing node scans one or more additional scanning targets based on the updated configuration message.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of coordinating a distributed vulnerability network scan, comprising:
   sending, by a computing node, a check-in message to a scanning coordinator, the check-in message indicating attributes of the computing node;
   determining, by the scanning coordinator, scan timing information for the computing node or a list of scanning targets for the computing node based on the attributes of the computing node:
   receiving, by the computing node, a scan configuration message from the scanning coordinator, the scan configuration message comprising:
      the scan timing information for the computing node; and
      the list of scanning targets for the computing node;
   determining, by the computing node, a scanning time window based on the scan timing information for the computing node; and
   scanning, by the computing node, one or more scanning targets in the list of scanning targets for the computing node during the scanning time window.

2. The method of claim 1, wherein the scan timing information for the computing node comprises:
   a starting time for synchronization of a first scanning group;
   a window length;
   a total number of scanning groups; and
   a scanning group number of the computing node.

3. The method of claim 2, wherein determining, by the computing node, the scanning time window based on the scan timing information for the computing node comprises identifying a beginning time of the scanning time window based on the starting time for synchronization of the first scanning group, the window length, and the scanning group number of the computing node.

4. The method of claim 1, wherein the scan timing information for the computing node further comprises a check-in frequency, and wherein the method further comprises sending, by the computing node, an additional check-in message to the scanning coordinator based on the check-in frequency.

5. The method of claim 4, wherein the additional check-in message comprises results of the scanning, by the computing node, the one or more scanning targets in the list of scanning targets for the computing node during the scanning time window.

6. The method of claim 1, further comprising receiving, by the computing node, an updated scan configuration message from the scanning coordinator, the updated scan configuration message comprising one or more of:
   updated scan timing information for the computing node; or an updated list of scanning targets for the computing node.

7. The method of claim 1, wherein the attributes of the computing node comprise one or more of:
an internet protocol (IP) address of the computing node;
one or more connections of the computing node;
a physical location of the computing node; or
resource availability information for the computing node.

8. The method of claim 1, further comprising assigning, by the scanning coordinator, the computing node to a scanning group based on the attributes of the computing node.

9. The method of claim 8, wherein assigning, by the scanning coordinator, the computing node to the scanning group based on the attributes of the computing node comprises generating a graph based on the attributes of the computing node.

10. A system for coordinating a distributed vulnerability network scan, comprising:
at least one memory; and
at least one processor coupled to the at least one memory, the at least one processor and the at least one memory configured to:
send, by a computing node, a check-in message to a scanning coordinator, the check-in message indicating attributes of the computing node;
determine, by the scanning coordinator, scan timing information for the computing node or a list of scanning targets for the computing node based on the attributes of the computing node;
receive, by the computing node, a scan configuration message from the scanning coordinator, the scan configuration message comprising:
the scan timing information for the computing node; and
the list of scanning targets for the computing node;
determine, by the computing node, a scanning time window based on the scan timing information for the computing node; and
scan, by the computing node, one or more scanning targets in the list of scanning targets for the computing node during the scanning time window.

11. The system of claim 10, wherein the scan timing information for the computing node comprises:
a starting time for synchronization of a first scanning group;
a window length;
a total number of scanning groups; and
a scanning group number of the computing node.

12. The system of claim 11, wherein determining, by the computing node, the scanning time window based on the scan timing information for the computing node comprises identifying a beginning time of the scanning time window based on the starting time for synchronization of the first scanning group, the window length, and the scanning group number of the computing node.

13. The system of claim 10, wherein the scan timing information for the computing node further comprises a check-in frequency, and wherein the method further comprises sending, by the computing node, an additional check-in message to the scanning coordinator based on the check-in frequency.

14. The system of claim 13, wherein the additional check-in message comprises results of the scanning, by the computing node, the one or more scanning targets in the list of scanning targets for the computing node during the scanning time window.

15. The system of claim 10, wherein the at least one processor and the at least one memory are further configured to receive, by the computing node, an updated scan configuration message from the scanning coordinator, the updated scan configuration message comprising one or more of:
updated scan timing information for the computing node; or
an updated list of scanning targets for the computing node.

16. The system of claim 10, wherein the attributes of the computing node comprise one or more of:
an internet protocol (IP) address of the computing node;
one or more connections of the computing node;
a physical location of the computing node; or
resource availability information for the computing node.

17. The system of claim 10, wherein the at least one processor and the at least one memory are further configured to assign, by the scanning coordinator, the computing node to a scanning group based on the attributes of the computing node.

18. A non-transitory computer-readable medium storing instructions that, when executed by one or more processors, cause the one or more processors to:
send, by a computing node, a check-in message to a scanning coordinator, the check-in message indicating attributes of the computing node;
determine, by the scanning coordinator, scan timing information for the computing node or a list of scanning targets for the computing node based on the attributes of the computing node;
receive, by the computing node, a scan configuration message from the scanning coordinator, the scan configuration message comprising:
the scan timing information for the computing node; and
the list of scanning targets for the computing node;
determine, by the computing node, a scanning time window based on the scan timing information for the computing node; and
scan, by the computing node, one or more scanning targets in the list of scanning targets for the computing node during the scanning time window.

* * * * *